Feb. 2, 1954    F. H. McCORMICK    2,668,223
DOMESTIC APPLIANCE
Filed March 30, 1951    2 Sheets-Sheet 1
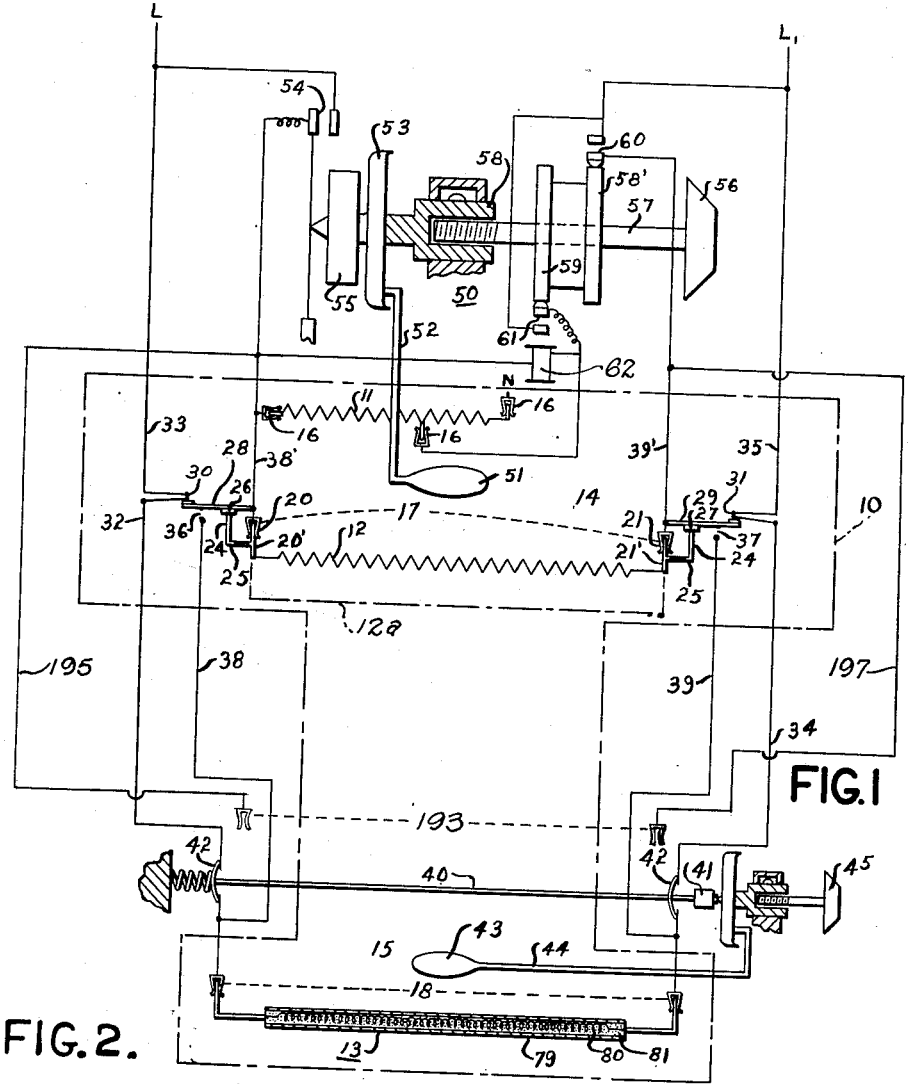
FIG.1
FIG.2.
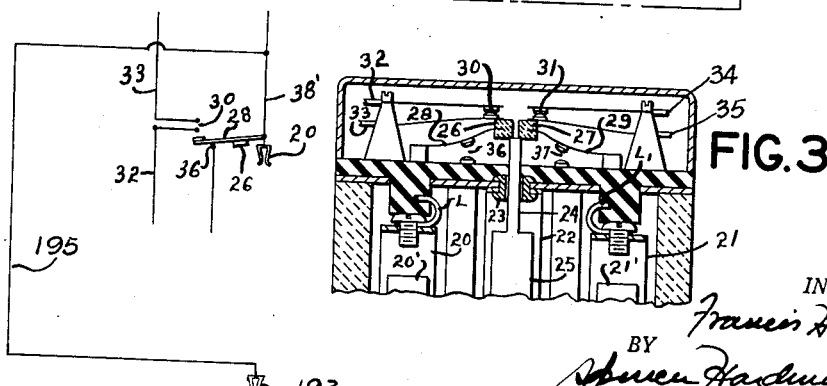
FIG.3
INVENTOR.
Francis H. McCormick
BY
Attorneys Feb. 2, 1954  F. H. McCORMICK  2,668,223
DOMESTIC APPLIANCE
Filed March 30, 1951  2 Sheets-Sheet 2
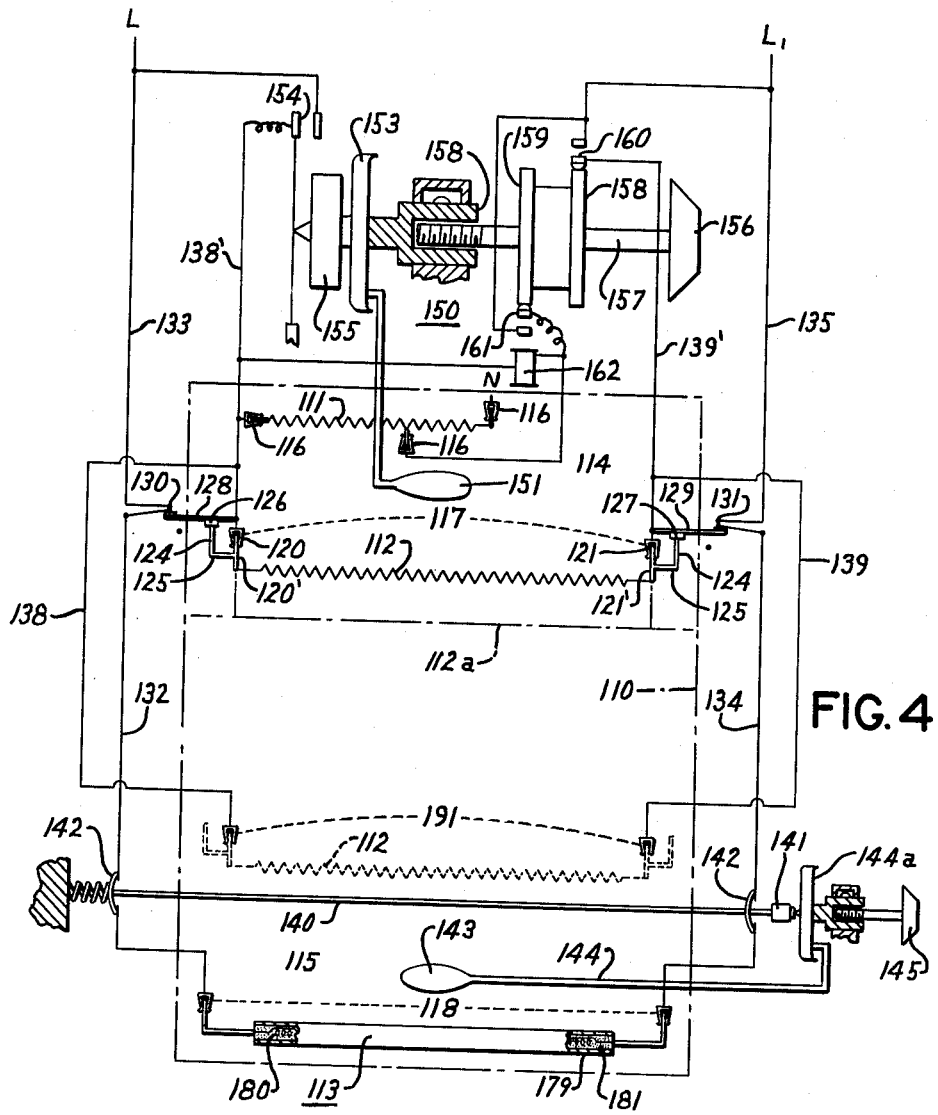
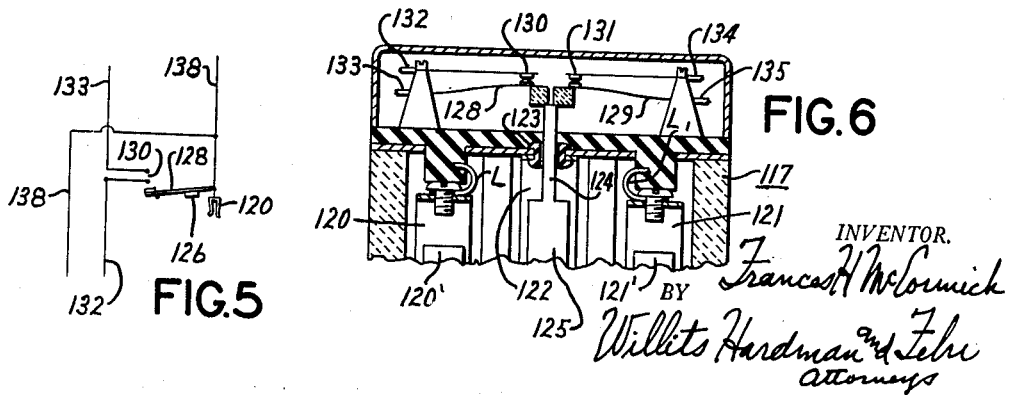
INVENTOR.
Francis H. McCormick
BY
Willits, Hardman and Fehr
Attorneys Patented Feb. 2, 1954

2,668,223

UNITED STATES PATENT OFFICE 2,668,223

DOMESTIC APPLIANCE

Francis H. McCormick, Oakwood, Ohio, assignor to General Motors Corporation, Dayton, Ohio, a corporation of Delaware Application March 30, 1951, Serial No. 218,413

23 Claims. (Cl. 219—35)

This application is a continuation in part of my copending application S. N. 105,106 filed July 16, 1949, now abandoned.

This invention relates to domestic appliances and more particularly to electric ovens.

This invention is directed to an oven having upper, intermediate, and lower heaters to provide two relatively small cooking compartments when all three heaters are in use, or one relatively large compartment when the intermediate heater is removed. Two thermostats are provided for controlling respectively the upper and intermediate heaters together, and the lower heater alone. In one form, when the intermediate heater is removed, one of the thermostats controls the upper and lower heaters. In another form, when the intermediate heater is removed, the lower heater is disabled. The intermediate heater can be reconnected in a position adjacent the lower heater.

An object of this invention is to provide an oven having three or more spaced heaters having two or more relatively small food heating spaces therebetween, the intermediate heater being removable to provide a relatively large cooking compartment between the upper and lower heaters.

Another object of this invention is to provide an oven having upper, intermediate and lower heaters for said oven providing two food heating spaces therebetween, with thermostats for said heaters effective to control all of said heaters when the intermediate heater is in the oven and one thermostat effective to control only the upper and lower heaters when the intermediate heater is removed from the oven.

Another object of this invention is to provide upper, intermediate and lower heaters, with thermostatic controls such that the upper space may be thermostatically controlled independently of the lower space and such that the upper and lower heaters are simultaneously thermostatically controlled when the intermediate heater is removed from the oven.

Another object of this invention is to provide an oven with upper, intermediate and lower heaters, with the intermediate heater being removable from the oven, with thermostatic controls and power connections such that a first thermostat controls the upper and intermediate heaters and a second thermostat controls the lower heater when the intermediate heater is in the oven, and said first thermostat controls the upper and lower heaters when the intermediate heater is removed from the oven.

Another object of this invention is to provide an oven with upper, intermediate and lower heaters, with the intermediate heater being removable from its intermediate position and movable to a lower position arranged so that the lower heater is open circuited when the intermediate heater is removed.

Further objects and advantages of the present invention will be apparent from the following description, reference being had to the accompanying drawings, wherein a preferred form of the present invention is clearly shown.

In the drawings:

Fig. 1 is a diagrammatic representation of one form of the oven, heaters, and controls;

Fig. 2 is a view of a portion of Fig. 1 with the parts in the position assumed when the intermediate heater is removed;

Fig. 3 is a cross-section of part of a prong receptacle for the removable intermediate heater showing the switch connections for the lower heater;

Fig. 4 is a diagrammatic representation of another form of the ovens, heaters, and controls;

Fig. 5 is a fragmentary view of a portion of Fig. 4 with the parts in a position assumed when the removable intermediate heater is removed; and Fig. 6 is a cross-sectional view of part of a prong receptacle for the intermediate heater of Figs. 4 and 5 showing the switch connections for the lower heater.

The first form of my invention may include an oven 10 which may be of any well known construction except for details herein disclosed. However, it is preferred to use an oven as more fully disclosed and broadly claimed in my copending application S. N. 105,105 filed July 16, 1949, modified as herein disclosed. The oven may also be as disclosed in my patent, 2,314,592, granted March 23, 1943, with an intermediate heater 12 added, which has a removable horizontal partition wall 12a to form upper and lower sub-compartments 14 and 15.

The oven 10 is indicated in this application by two dotted lines 10; but it is to be understood that it is a single compartment, of the character disclosed in my said copending application, or my said patent, and having independent electric upper broil, intermediate and lower heaters 11, 12 and 13 respectively, to form food cooking spaces 14 and 15 above and below the intermediate heater 12.

If desired, the intermediate heater 12 may be provided with a distributing baffle above the resistance element, which baffle may be substantially identical with the baffle 60 disclosed in my said Patent 2,314,592.

The heaters may be supported by any suitable means, such as by brackets 276, 278, 226, 228 or 280 shown in my Patent 2,314,592 issued March 23, 1943.

The upper heater may be provided with a reflector to reflect the rays downwardly. The lower heater may be formed of an outer tube 79 within which is placed the resistance 80, embedded in impacted insulation, which is a well-known construction, or it may be the same as the lower oven heater disclosed in my said Patent 2,314,592.

The food cooking spaces 14 and 15 are capable of maintaining the different temperatures and different conditions of heating, so that baking, broiling and/or warming may be accomplished simultaneously and independently within the oven. The intermediate heater 12 is removable from the oven to form a single large compartment substantially equal in volume to the previous separate compartments 14 and 15, and capable of receiving a large turkey or the like.

Power connectors 16, 17 and 18 are provided. Connectors 16 and 18 provide power for the upper and lower heaters 11 and 13 respectively and may be of any suitable bayonet construction which allow the heaters to be removed for cleaning, repairing and the like. The connector 17 is somewhat similar to connectors 16 and 18; but is provided with means effective to place the upper and lower heaters under the control of a single thermostat, when the removable heater 12 is removed from the oven.

The connector 17 may be constructed as shown in Fig. 3, and may include the power line bayonet slots 20 and 21 and the neutral bayonet slot 22. The slots 20 and 21 may be connected to the power lines L and L1, and receive the power prongs 20' and 21' of heater 12, while the connector 22 may be connected to the neutral wire or to ground as is usual and receives the ground prong 25 of the heater 12. In addition, the neutral connector 22 is provided with an insulating opening 23 through which the extension 24 of the heater ground prong 25 may project. The extension 24 is adapted to engage two insulating caps 26 and 27 carried by the "downwardly" biased blades 28 and 29. The "upward" movement of caps 26 and 27 closes the switches 30 and 31, which are biased to open position. The blades of the switch 30 are connected to the lines 32 and 33. The blades of switch 31 are connected to lines 34 and 35. The movements of the blades 28 and 29 also open and close the switches 36 and 37. Switch 36 controls the connection and opening of lines 38 and 38'. Switch 37 controls the connection and opening of lines 39 and 39'. Thus, when the prongs of heater 12 are inserted in the connector 17, the power connection to the lower heater 13 passes to the power line L, through contacts 42 of the thermostat 40 and lines 32 and 33, and to power line L1, through contacts 42 and lines 34 and 35 because of the closing of switches 30 and 31. When the prongs of heater 12 are removed from the connector 17, then the lower heater 13 is connected for control by thermostat 50 through closed switches 36 and 37 which connect the lines 38, 38' and 39, 39' respectively. Hence, when heater 12 is in the oven, thermostat 50 controls heaters 11 and 12, while thermostat 40 controls heater 13, and when removable heater 12 is removed from the oven, thermostat 50 controls heaters 11 and 13.

The lower heater 13 is controlled by thermostatic switch 40 which may include the usual snap-acting mechanism 41 capable of opening and closing the contacts 42 in response to temperature variations within the space 15, which act upon the bulb 43, connected by the tube 44 with the snap-acting mechanism 41, as is well known. The mechanism 41 may be adjusted by the knob 45, capable of adjusting the mechanism to be responsive to various temperatures, as selected by the setting of the knob 45, and capable of maintaining the contacts 42 fully open in the "off" position, regardless of oven and room temperatures.

Thermostatic means 50 for controlling the temperature within the space 14 (or the combined space 14 and 15 when heater 12 is removed from the oven) may also be provided, and this may include a thermostatic construction substantially identical with that disclosed in patent to M. E. Fry, No. 2,388,839 granted November 13, 1945. Briefly stated it may include a thermostatic bulb 51 connected by tube 52 to a diaphragm or bellows 53, which opens and closes the contact 54 by a snap-acting mechanism 55. The temperature setting may be adjusted by means of knob 56 connected to a shaft 57 which has a threaded connection with the sleeve 58 axially to adjust the bellows 53. The knob 56 may have an "off" position, a "broil" position, and a plurality of temperature positions, which are the "bake" positions. The highest temperature is the "broil" position. The shaft 57 is provided with selector cams 58 and 59, which open and close the contacts 60 and 61 at proper settings of the knob 56. In the "off" position contacts 60, 61 and 54 are open. In the "broil" position contacts 61, and 54 are closed, and contacts 60 are open. This energizes the upper heater 11 at full capacity, as described in the Fry patent. If the knob 56 is turned to any of the temperature positions except the "broil" position, the contacts 54 and 60 are closed and the contacts 61 are open, thus energizing the intermediate heater 12 (or the lower heater 13 if heater 12 is removed from the oven) at full capacity, and the upper heater 11 at reduced output, these heaters being subsequently cycled by the thermostatic opening and closing of the contacts 54 in response to temperatures acting on the bulb 51. If the knob 56 is first turned to broil, and then back to some baking position, the upper heater 11 and intermediate heater 12 (or the lower heater 13 if the heater 12 is removed from the oven) are both energized at full capacity until the space 14 (or the combined space 14 and 15, if heater 12 is removed from the oven) reaches the desired temperature. This is accomplished by the closing of contacts 54 and 61 in the broil position, the contacts 61 being maintained closed by the holding solenoid 62 after the knob 56 is moved to the bake position, the contacts 60 being closed in the bake position. Therefore, for one heating cycle, both heaters 11 and 12 (or heaters 11 and 13, as the case may be) are at full capacity, the cycle being terminated by the opening of contacts 54, which opening deenergizes the solenoid 62 and allows the heater 11 thereafter to be re-energized at reduced output with the other heater at full capacity, as more fully described in the Fry patent.

Preferably the intermediate heater 12 is provided with an imperforate partition extending below its resistance element substantially throughout the horizontal extent of the oven, to form the two substantially thermally separated spaces 14 and 15. Some slight opening may be provided in the partition which is only sufficiently large to allow the vapors to flow through said opening from the compartment 15 to the compartment 14, from whence they may flow through a vent in compartment 14, which vent may be of the usual construction. This opening should not be sufficiently large to provide any substantial thermal exchange. Such construction is shown and claimed in my said copending application.

A door may be provided, as fully shown and claimed in my copending application, which has a fully closed position, a slightly ajar position, and a fully open position, the mounting, hinging and supporting of the door being of any well known construction, for example, such as is disclosed in my Patent 2,308,768 granted June 19, 1943. The door lining as in my co-pending application S. N. 105,105, may be provided with a bulging portion adapted to cooperate with the front lip of the partition 12a of heater 12 in such a manner that when the door is in the slightly ajar position, which may be called the broil station, the compartment 15 is substantially closed, while the compartment 14 is maintained slightly open. Under these conditions, the compartment 14 may be used for broiling, and the temperature within the compartment is thus prevented from rising sufficiently to cycle the contacts 54 of the upper thermostat 50. At the same time the compartment 15 may be used for baking or warming, because of its substantially closed condition. When the door is in its fully open position, which may be substantially horizontal, both compartments 14 and 15 are fully open. When the door is in its fully closed position, with its upper part substantially against the upper edge of the oven, then both compartments 14 and 15 are substantially closed, under which conditions either or both of the compartments may be used for either baking or warming, as desired.

In the operation of my invention, if it is desired to broil in the compartment 14, while simultaneously baking and/or warming in the compartment 15, with all three heaters in the oven the knob 56 is turned to broil, and the knob 45 is turned to the desired baking temperature. The article to be broiled is placed on a shelf supported on one of the brackets corresponding to 280 in my Patent 2,314,592, within the compartment 14, while the article to be baked is placed on a shelf supported on a similar bracket within the compartment 15. The door is placed in a slightly ajar position. If it is desired to remove or insert articles in either of the compartments 14 or 15, the door is placed in its fully open position. If it is desired to bake and/or warm in both of the compartments 14 and 15, the knobs 56 and 45 are adjusted to the desired baking conditions, articles are placed in both compartments 14 and 15, and the door is placed in its fully closed position.

Should it be desired to bake or broil a very large article, the intermediate heater 12 is removed from the oven, and the knob 56 is adjusted to the desired condition. The article is supported on proper shelving at the desired elevation, and the door is placed either in the slightly ajar position for broiling or in the fully closed position for baking, roasting or warming. Under such conditions the heaters 11 and 13 are controlled by thermostat 50, to maintain the combined compartment 14, 15 in the desired cooking condition.

If it is desired to provide more rapid heating than is possible with the lower heater 113 alone when the oven is arranged into a single large compartment, a second receptacle connector 193 is provided for the intermediate heater 12 immediately above the lower receptacle connector 18 and the lower heater 13. The receptacle connector 193 is connected by the conductors 195 and 197 to the conductors 138' and 139' providing an electrical connection similar to the electrical connection for the receptacle connector 17. The horizontal partition wall 12a is made removable from the intermediate heater 12. After the partition wall 12a has been removed from the heater 12, the intermediate heater 12 is inserted into electrical connection with the receptacle connector 193 immediately above the lower heater 13. The receptacle connector 193 may be similar to the receptacle connector 17 as shown in Fig. 3 with the switch mechanisms omitted. In this arrangement, bottom heat is provided by both the intermediate and lower heaters 12 and 13 and the top heat is provided by the upper heater 11, with all three heaters 11, 12 and 13 being under the control of the upper thermostat 50. The lower thermostat 40 is of course disabled by the removal of the intermediate heater from the receptacle 17.

It is obvious that either of the compartments 14 and 15 may be used alone, without using the other compartment, if desired.

The second form of my invention discloses an oven 110 very similar to the first form which may be of any well known construction except for the details herein specified. It is preferred to use an oven as more fully disclosed and more broadly claimed in my copending application S. N. 105,105 filed July 16, 1949, modified as herein disclosed. The oven 110 may also be as disclosed in my Patent 2,314,592 granted March 23, 1943, with an intermediate heater 112 added which has a horizontal partition wall 112a to form upper and lower subcompartments 114 and 115.

The oven 110 is designated by the dot-and-dash outline to which the reference character 110 is applied. It is to be understood that it is a single compartment as disclosed in my copending application S. N. 105,105 and having an independent electric upper broil electric heater 111 and an independent intermediate removable electric heater 112 and an independent lower electric heater 113.

Preferably the intermediate electric heater 112 is provided with an imperforate partition 112a extending below its electrical resistance element substantially throughout the horizontal extent of the oven 110 to substantially isolate the upper and lower subcompartments 114 and 115. A small opening may be provided in the partition 112a sufficient to allow vapors to flow from the subcompartment 15 to the subcompartment 14 where they may escape through a vent. This opening should not interfere with a thermal isolation of the two subcompartments. Preferably the intermediate heater 112 is provided with a distributing baffle above the resistance element which may be identical to the baffle 60 disclosed in my Patent 2,314,592. The heaters may be supported by any suitable means such as by the supports 276, 278, 226, 228 or 280 as shown in my Patent 2,314,592 issued March 23, 1943.

The upper heater 111 may be provided with a reflector to reflect the rays downwardly. The lower heater 113 is preferably of the sheathed tubular type having an electrical resistance element 180 embedded in impacted insulation within an outer tube 179.

The intermediate electric heater 112 with its partition 112a divides the single compartment of the oven into upper and lower subcompartments 114 and 115 to form food cooking spaces above and below the intermediate heater 112. These subcompartments 114 and 115 are capable of maintaining different temperatures and different conditions of heating simultaneously so that baking, broiling and/or warming may be accomplished simultaneously and independently within the oven as in the first form.

The intermediate independent electric heater 112 with its partition 112a is removable from the oven to form a single large compartment substantially equal in volume to the previous separate subcompartments 114 and 115 so that it is capable of receiving a large turkey or other food to be cooked. However, this intermediate removable electric heater 112 can be reinserted into a separate receptacle connector 191 immediately above the receptacle connector 118 for the lower heater 113 so that it may be used for supplying the bottom heat for the entire oven compartment.

Power receptacle connectors 116, 117 and 118 are provided in the upper, intermediate and lower parts of the oven for making electrical connection with the upper, intermediate and lower heaters in their normal positions. The connectors 116 and 118 provide electric connections for the upper and lower heaters 111 and 113 respectively which may be of any suitable receptacle construction which will allow the heaters to be removed for cleaning, repairing and the like. The connector 117 is somewhat similar to the connectors 116 and 118 but it is provided with switch means effective to open the circuit of the lower heater 113 when the removable heater 112 is removed from the oven 110.

One form of construction for the receptacle connector 117 is shown in Fig. 6 and includes the electrical slot connectors 120 and 121 and the neutral slot connector 122. The slot connectors 120 and 121 are connected to the power supply conductors L and L1. These slot connectors are adapted to receive the electrical prongs 120' and 121' of the intermediate electric heater 112 while the slot connector 122 is connected to the neutral wire or to the ground as is usual. This connector 122 receives the ground prong 125 of the intermediate heater 112. As in the first form, the neutral connector 122 is provided with an insulated opening 123 through which the extension 124 of the ground prong 125 projects when the prongs of the intermediate heater 112 are inserted into this receptacle connector 117.

The extension 124 under such circumstances engages the two insulating blocks 126 and 127 carried by the downwardly sprung or biased spring blades 128 and 129 which connect respectively to the conductors 133 and 135. The spring blades 128 and 129 adjacent the blocks 126 and 127 carry contacts which are adapted to engage the contacts 130 and 131 respectively mounted upon the ends of spring blades which at their anchored ends are connected to the conductors 132 and 134. When the prongs of the intermediate heater 112 are inserted into the receptacle connector 117, current flows from the power line L through the conductor 133, the spring blade 128, the contact 130 and its spring blade, the conductor 132 to the contacts 142 of the thermostat 140 which connect to the one connection of the lower receptacle connector 118 with the lower heater 113. The other connection with the lower heater 113 connects to the second contact 142 of the thermostat 140 which in turn connects to the conductor 134, the blade and contact 131, the spring blade 129 and the conductor 135 which connects to the line L1.

When the intermediate heater 112 is removed, its prongs 120' and 121' and 125 are removed from the receptacle 117. This causes the spring blades 128 and 129 to spring away from the contact 130 and 131 to disconnect the lower heater 113 from the supply conductors L and L1. The intermediate heater 112 may then be reinserted into the oven 110 at a position immediately below the lower heater 113. A receptacle connector 191 is located immediately above the receptacle connector 118 for making the electrical connection with the immediate heater in its lower position. The receptacle connector 191 may be similar to the receptacle connector 116 shown in Fig. 6 but the switch mechanisms are omitted. The receptacle connector 191 has its slot connectors 120 and 121 connected by the conductors 138 and 139 to the conductors 138' and 139' which in turn connect to the contacts 154 and 160.

The contacts 142 of the lower thermostatic switch 140 are connected by some form of snapping mechanism 141 with the operating diaphragm 144a. The temperature variations in the lower subcompartment 115 act upon the bulb 143 which is connected by the tube 144 with the operating diaphragm 144a. To operate the switch contacts 142 in accordance with changes in temperature as is well known, the operating temperatures of the thermostat 140 are adjusted by the knob 145. This knob 145 controls the thermostat so as to provide an off position as well as various temperature conditions up to the maximum temperature desired. A broil position beyond or coinciding with the maximum temperature may also be provided on the knob 145.

An upper thermostatic means 150 is provided for controlling the temperature of the upper subcompartment 114. This thermostatic means 150 and its connections may be substantially identical to that disclosed in the Fry Patent 2,388,339 granted November 13, 1935. There is provided a thermostat bulb 151 in the upper subcompartment 114 connected by a tube 152 to an operating diaphragm 153 which through a snap acting mechanism 155 opens and closes the contact 154 which when closed connects to the supply connector L. The temperature setting of the thermostat 150 is adjusted by the knob 156 connected to a shaft 157 which has a threaded connection with the sleeve 158 to adjust the axial position of the diaphragm 153. The knob 156 preferably has an off position for disconnecting the upper and intermediate heaters from the supply conductors and a plurality of temperature positions for baking and a broil position which may coincide with or be beyond the highest baking temperature position.

The shaft 157 is provided with selector cams 158 and 159 which open and close the contacts 160 and 161 in certain positions of the knob 156. In the off position of this knob 156, the contacts 160, 161 and 154 are open. In the broil positions, the contacts 161 and 154 are closed while the contacts 160 are open. In this broil position, the upper heater 111 alone is energized at full capacity as described in the above mentioned Fry patent. If the knob 156 is turned to any of the temperature positions except the broil position, the contacts 154 and 160 are closed while the contacts 161 are open thereby energizing the intermediate heater 112 at full capacity and the upper heater 111 at a reduced output. These heaters are subject to the opening and closing of the thermostat contacts 154 in response to temperatures of the upper subcompartment 114.

If the knob 156 is first turned to broil and then to some lesser baking temperature position, the upper heater 111 and the intermediate heater 112 are both energized at full capacity until the upper subcompartment 114 reaches the desired temperature. This is accomplished by the closing of the contacts 154 and 161 in the broil position. The contacts 161 are maintained in the closed position by the holding solenoid 162 after the knob 156 is moved to the selected lesser temperature position. At any one of the selected lesser temperature positions, the contacts 160 are closed. Therefore, for one heating cycle, both the upper and intermediate heaters 111 and 112 operate at full capacity which heating cycle is terminated by the opening of the contacts 154. This opening deenergizes the solenoid 162 permitting the contacts 161 to open to cause the upper heater 111 to thereafter be re-energized at reduced output with the intermediate heater 112 at full capacity as is more fully described in the above mentioned Fry patent.

The oven 110 is preferably provided with a door such as is shown and claimed in my copending application S. N. 105,105 filed July 16, 1949. This door has a fully closed position, a slightly ajar position providing a broiling station for broiling purposes and a fully open position. The mounting, hinging and supporting of this door may be of any well known construction, for example, like that disclosed in my Patent 2,308,768 granted June 19, 1943. The door lining, as in my copending application S. N. 105,105, is preferably provided with a bulging portion adapted to cooperate with the front lip of the partition 112a of the intermediate heater 112 and with the walls of the oven 110 in such a manner that when the door is in the slightly ajar position which may be called the broil station, the lower subcompartment 115 is substantially closed while the upper subcompartment 114 is slightly open.

Under these conditions, the upper subcompartment 114 may be used for broiling and the temperature within this upper subcompartment 114 is thus prevented from raising sufficiently to cycle the contacts 154 of the upper thermostat 150. At the same time, the lower subcompartment 115 may be used independently for baking or warming because of its substantially isolated condition. When the door is in its fully open position which may be substantially horizontal, both subcompartments 114 and 115 are fully open. When the door is in its fully closed position with its upper part substantially against the upper edge of the oven, then both subcompartments 114 and 115 will be substantially closed and isolated from each other under which condition either or both of the subcompartments may be used for either baking or warming as desired.

The simultaneous use of both subcompartments is the same as that described in the first form of the invention. The forms differ however in their operation when the intermediate heater 112 is removed from the oven 110. When this is done, the opening of the contacts 130 and 131 disconnects the lower heater 113 from the supply conductors L and L₁. The replacing of the intermediate heater 112 in its lower position in connection with the receptacle connector 191 causes the intermediate heater 112 to operate in its lower position in the same manner as it did in its intermediate position. In either position, it provides the large amount of bottom heat required for heating the oven while the upper heating unit 111 supplies sufficient heat to provide a substantially uniform temperature condition within the oven.

This application is also related to S. N. 213,721 filed March 3, 1951, which is a continuation in part of S. N. 105,105. S. N. 213,721 includes claims to the door construction for the oven compartment.

While the form of embodiment of the invention as herein disclosed, constitutes a preferred form, it is to be understood that other forms might be adopted, as may come within the scope of the claims which follow.

What is claimed is as follows:

1. In combination: an oven; an upper heater in the upper part of said oven; a lower heater in the lower part of said oven; an intermediate removable heater in said oven in a relatively central position to form two food heating spaces between said intermediate heater and said upper and lower heaters; a first thermostat controlling said upper and intermediate heaters, a second thermostat controlling said lower heater; and means causing one of said thermostats only to control said upper and lower heaters and rendered operable by the removal of said intermediate heater.

2. In combination: an oven; an upper heater in the upper part of said oven; a lower heater in the lower part of said oven; an intermediate removable heater in said oven in a relatively central position to form two food heating spaces between said intermediate heater and said upper and lower heaters; a first thermostat controlling two heaters adjacent one of said spaces; a second thermostat controlling the other heater; and means causing one of said thermostats to control said upper and lower heaters and rendered operable by the removal of said intermediate heater.

3. In combination: an oven; first, second and third heaters in said oven, said second heater being removable from the oven; a first thermostat controlling said first and second heaters, a second thermostat controlling said third heater; and means causing one of said thermostats to control said first and third heaters and rendered operable by the removal of said second heater from the oven.

4. In combination: an oven; an upper heater in the upper part of said oven; a lower heater in the lower part of said oven; an intermediate removable heater in said oven in a relatively central position to form two food heating spaces between said intermediate heater and said upper and lower heaters; a first thermostat controlling said upper and intermediate heaters, a second thermostat controlling said lower heater; and means causing said first thermostat only to control said upper and lower heaters and rendered operable by the removal of said intermediate heater.

5. In combination: an oven; an upper heater in the upper part of said oven; a lower heater in the lower part of said oven; an intermediate movable heater in said oven in a relatively central position to form two food heating spaces between said intermediate heater and said upper and lower heaters; a first thermostat controlling two heaters adjacent one of said spaces; a second thermostat controlling the other heater; and means causing said first thermostat to control said upper and lower heaters and rendered operable by the removal of said intermediate heater.

6. In combination: an oven; first, second and third heaters in said oven, said second heater being removable from the oven; a first thermostat controlling said first and second heaters; a second thermostat controlling said third heater; and means causing one of said thermostats to control said first and third heaters rendered operable by the removal of said second heater from the oven, one of said thermostats having a single knob energizing one heater in broil position, one heater at reduced output and another heater at full capacity in bake position and disconnecting two heaters in the off position.

7. In combination: an oven; an upper heater in the upper part of said oven; a lower heater in the lower part of said oven; an intermediate removable heater in said oven in a relatively central position to form two food heating spaces between said intermediate heater and said upper and lower heaters; a first thermostat controlling said upper and intermediate heaters, a second thermostat controlling said lower heater; and means causing said first thermostat only to control said upper and lower heaters rendered operable by the removal of said intermediate heater, said first thermostat having a single knob energizing the upper heater in broil position, the upper heater at reduced output and another heater at full capacity in bake position and disconnecting said upper and said another heater in the off position.

8. In combination: an oven; an upper heater in the upper part of said oven; a lower heater in the lower part of said oven; an intermediate removable heater in said oven in a relatively central position to form two food heating spaces between said intermediate heater and said upper and lower heaters; a first thermostat controlling said upper and intermediate heaters, a second thermostat controlling said lower heater; and electric circuit and switch means for transferring the control by said thermostats to one of said thermostats and rendered operable by the removal of said intermediate heater from said central position.

9. In combination: an oven; an upper heater in the upper part of said oven; a lower heater in the lower part of said oven; an intermediate removable heater in said oven in a relatively central position to form two food heating spaces between said intermediate heater and said upper and lower heaters; a first thermostat controlling two heaters adjacent one of said spaces; a second thermostat controlling the other heater; and electric circuit and switch means for transferring the control by said thermostats to one of said thermostats and rendered operable by the removal of said intermediate heater from said central position.

10. In combination: an oven; first, second and third heaters in said oven, said second heater being removable from the oven; a first thermostat controlling said first and second heaters; a second thermostat controlling said third heater; and electric circuit and switch means causing a change in the control by causing said thermostats to simultaneously control said first and third heaters and rendered operable by the removal of said second heater.

11. In combination: an oven, an independent upper broil electric heater in the upper part of said oven, an independent lower electric heater in the lower part of said oven, a removable independent intermediate electric heater at an intermediate position within said oven intermediate the upper and lower heaters dividing the oven into upper and lower sub-compartments, an upper thermostat responsive to the temperature in the upper sub-compartment for controlling said upper and intermediate heaters, a lower thermostat responsive to the temperature in the lower sub-compartment for controlling said lower heater, and means responsive to the removal of the intermediate electric heater from its intermediate position for disabling said lower thermostat.

12. In combination, an oven, an independent upper broil electric heater in the upper part of said oven, an independent lower electric heater in the lower part of said oven, a removable independent intermediate electric heater at an intermediate position within said oven intermediate the upper and lower heaters dividing the oven into upper and lower sub-compartments, and means responsive to the removal of the intermediate electric heater from its intermediate position for disabling said lower heater.

13. In combination, an oven, an independent upper broil electric heater in the upper part of said oven, an independent lower electric heater in the lower part of said oven, a removable independent intermediate electric heater at an intermediate position within said oven intermediate the upper and lower heaters dividing the oven into upper and lower sub-compartments, an electric circuit including upper, intermediate and lower receptacles for making electrical connection with said upper, intermediate and lower heaters, said intermediate receptacle being provided with switch means operated by the connection and disconnection of said intermediate heater with the intermediate receptacle for disabling said lower heater.

14. In combination, an oven, an independent upper broil electric heater in the upper part of said oven, an independent lower electric heater in the lower part of said oven, a removable independent intermediate electric heater at an intermediate position within said oven intermediate the upper and lower heaters dividing the oven into upper and lower sub-compartments, an upper thermostat responsive to the temperature in the upper sub-compartment for controlling said upper and intermediate heaters, a lower thermostat responsive to the temperature in the lower sub-compartment for controlling said lower heater, an electric circuit including upper, intermediate and lower receptacles for making electrical connection with said upper, intermediate and lower heaters, said intermediate receptacle being provided with switch means operated by the connection and disconnection of said intermediate heater with the intermediate receptacle for disabling said lower thermostat.

15. In combination, an oven, an independent upper broil electric heater in the upper part of said oven, an independent lower electric heater in the lower part of said oven, a removable independent intermediate electric heater at an intermediate position within said oven intermediate the upper and lower heaters dividing the oven into upper and lower sub-compartments, an upper thermostat responsive to the temperature in the upper sub-compartment for controlling said upper and intermediate heaters, a lower thermostat responsive to the temperature in the lower sub-compartment for controlling said lower heater, an electric circuit including upper, intermediate and lower receptacles for making electrical connection with said upper, intermediate and lower heaters, said intermediate receptacle being provided with switch means operated by the connection and disconnection of said intermediate heater with the intermediate receptacle for disabling said lower heater, and an additional receptacle immediately above said lower receptacle providing a second position for said intermediate heater.

16. In combination, an oven, an upper electric heater located at the top of the oven, a lower electric heater located at the bottom of the oven, a removable intermediate electric heater located intermediate the top and bottom of the oven, a horizontal partition wall adjacent the intermediate heater to form upper and lower compartments, a first thermostat responsive to temperatures in the upper compartment for controlling said upper heater, a second thermostat responsive to temperatures in the lower compartment for controlling said lower heater, biased double throw switch means normally biased to a first position bypassing one of said thermostats, said switch means having a second position connecting said thermostats in parallel circuits with each other, said removable heater having means effective when located in its intermediate position for holding said switch means in said second position.

17. In combination, a domestic electric oven including walls and a door enclosing an oven compartment, an independent upper broil electric heater in the upper part of said oven compartment, an independent lower electric heater in the lower part of said oven compartment, a removable independent horizontal intermediate electric heater at an intermediate position within said oven compartment intermediate the upper and lower heaters dividing the oven into upper and lower subcompartment, a lower thermostatic double pole switch means responsive to the temperature in the lower sub-compartment having one set of terminals connected to the terminals of said lower heater, a second double pole switch means controlled by said intermediate heater and held in closed position when said intermediate heater is in its intermediate position and movable to open position when said intermediate heater is removed from its intermediate position, the second set of terminals of said lower thermostatic switch means being connected to one of the terminals of said second switch means, a set of supply conductors connected to the second set of terminals of the second switch means, and an upper adjustable thermostatic switch means responsive to temperatures in said upper sub-compartment for connecting and disconnecting the upper and intermediate heaters to the supply conductors.

18. In combination, a domestic electric oven including walls and a door enclosing an oven compartment, an independent upper broil electric heater in the upper part of said oven compartment, an independent lower electric heater in the lower part of said oven compartment, a removable independent horizontal intermediate electric heater at an intermediate position within said oven compartment intermediate the upper and lower heaters dividing the oven into upper and lower sub-compartments, a lower thermostatic double pole switch means responsive to the temperature in the lower sub-compartment having one set of terminals connected to the terminals of said lower heater, a second double pole switch means controlled by said intermediate heater and held in closed position when said intermediate heater is in its intermediate position and movable to open position when said intermediate heater is removed from its intermediate position, the second set of terminals of said lower thermostatic switch means being connected to one set of the terminals of said second switch means, a set of supply conductors connected to the second set of terminals of the second switch means, and an upper adjustable thermostatic switch means responsive to temperatures in said upper sub-compartment for connecting and disconnecting the upper and intermediate heaters to the supply conductors, a second set of electrical terminals in said lower sub-compartment connected to the terminals of said upper switch means, said second set of terminals being complementary to the terminals of said intermediate heater to provide a lower electrically connected position for said intermediate heater.

19. In combination, an oven; an upper heater in the upper part of said oven; a lower heater in the lower part of said oven; an intermediate removable heater in said oven in a relatively central position to form two food heating spaces between said intermediate heater and said upper and lower heaters; a first thermostat controlling said upper and intermediate heaters, a second thermostat controlling said lower heater, a set of electrical supply conductors, and switch means controlled by the positioning in and the removal of the intermediate heater from its central position for connecting and disconnecting said second thermostat from the supply conductors.

20. In combination, an oven, an independent upper broil electric heater in the upper part of said oven, an independent lower electric heater in the lower part of said oven, a removable independent intermediate electric heater at an intermediate position within said oven intermediate the upper and lower heaters dividing the oven into upper and lower sub-compartments, an electric circuit including upper, intermediate and lower receptacles for making electrical connection with said upper, intermediate and lower heaters, said intermediate receptacle being provided with switch means operated by the connection and disconnection of said intermediate heater with the intermediate receptacle, said switch means being connected in series with said lower heater.

21. In combination, an oven, an independent upper broil electric heater in the upper part of said oven, an independent lower electric heater in the lower part of said oven, a removable independent intermediate electric heater at an intermediate position within said oven intermediate the upper and lower heaters dividing the oven into upper and lower sub-compartments, an electric circuit including upper, intermediate and lower receptacles for making electrical connection with said upper, intermediate and lower heaters, said intermediate receptacle being provided with switch means operated by the connection and disconnection of said intermediate heater with the intermediate receptacle, said switch means being connected in series with said lower heater, and an additional receptacle immediately above said lower receptacle providing a second position for said intermediate heater.

22. In combination, an oven, an independent upper broil electric heater in the upper part of said oven, an independent lower electric heater in the lower part of said oven, a removable independent intermediate electric heater at an intermediate position within said oven intermediate the upper and lower heaters dividing the oven into upper and lower sub-compartments, an electric circuit including upper, intermediate and lower receptacles for making electrical connection with said upper, intermediate and lower heaters, said intermediate receptacle being provided with switch means connected in series circuit with said lower heater, said switch means being provided with an arrangement for biasing it to open said circuit to said lower heater, said intermediate heater being provided with means effective when connected to said intermediate receptacle for holding closed said switch means.

23. In combination, an oven, an independent upper broil electric heater in the upper part of said oven, an independent lower electric heater in the lower part of said oven, a removable independent intermediate electric heater at an intermediate position within said oven intermediate the upper and lower heaters dividing the oven into upper and lower sub-compartments, an upper thermostat responsive to the temperature in the upper sub-compartment for controlling said upper and intermediate heaters, a lower thermostat responsive to the temperature in the lower sub-compartment for controlling said lower heater, an electric circuit including upper, intermediate and lower receptacles for making electrical connection with said upper, intermediate and lower heaters, said intermediate receptacle being provided with a normally open switch means connected in said electric circuit in series with said lower thermostat, said intermediate heater being provided with means effective when connected to said intermediate receptacle for holding closed said switch means.

FRANCIS H. McCORMICK.

References Cited in the file of this patent

UNITED STATES PATENTS

| Number | Name | Date |
|---|---|---|
| 1,118,454 | Weeks | Nov. 24, 1914 |
| 1,637,435 | Brown | Aug. 2, 1927 |
| 1,996,625 | Pendleton | Apr. 2, 1935 |
| 2,146,427 | Hawkins | Feb. 7, 1939 |
| 2,273,734 | Pearce | Feb. 17, 1942 |
| 2,415,768 | Shaw | Feb. 11, 1947 |

FOREIGN PATENTS

| Number | Country | Date |
|---|---|---|
| 93,215 | Switzerland | Mar. 1, 1922 |
| 117,996 | Great Britain | Aug. 15, 1918 |
| 600,388 | Great Britain | Apr. 7, 1948 |